US008558494B2

(12) United States Patent
Tseng et al.

(10) Patent No.: US 8,558,494 B2
(45) Date of Patent: Oct. 15, 2013

(54) DRIVING DEVICE OF BRUSHLESS DC MOTOR FOR FAN

(75) Inventors: Wei-Shuo Tseng, Taoyuan Hsien (TW); Chia-Pin Wei, Taoyuan Hsien (TW); Yu-Wei Lee, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 327 days.

(21) Appl. No.: 13/046,270

(22) Filed: Mar. 11, 2011

(65) Prior Publication Data
US 2012/0104981 A1     May 3, 2012

(30) Foreign Application Priority Data
Nov. 2, 2010     (TW) .................................. 99137578 A (51) Int. Cl.
*H02P 27/00*     (2006.01)
*H02P 6/00*     (2006.01)

(52) U.S. Cl.
CPC ........................................ *H02P 6/001* (2013.01)
USPC .................... 318/400.3; 318/400.01; 318/700

(58) Field of Classification Search
CPC ....................................................... H02P 6/001
USPC .................................. 318/400.3, 400.01, 700
See application file for complete search history.

(56) References Cited

U.S. PATENT DOCUMENTS

| 4,673,858 | A  | * | 6/1987  | Saito ............................ 318/805 |
| 6,144,564 | A  | * | 11/2000 | Fraidlin et al. .................. 363/16 |
| 6,538,909 | B2 | * | 3/2003  | Goodarzi et al. ............... 363/98 |
| 7,659,678 | B2 | * | 2/2010  | Maiocchi ................. 318/400.22 |

* cited by examiner

*Primary Examiner* — Bentsu Ro
*Assistant Examiner* — David Luo
(74) *Attorney, Agent, or Firm* — Muncy, Geissler, Olds & Lowe, PLLC (57) ABSTRACT

A driving device is electrically connected with an AC power and a brushless DC motor for a fan. The driving device includes a rectifier unit, a filter unit, a switch power conversion unit and a control unit. The rectifier unit receives the AC power and rectifies the AC power. The filter unit, electrically connected with the rectifier unit, filters the rectified AC power and generates a DC power. The switch power conversion unit, electrically connected with the filter unit and the brushless DC motor, receives the DC power and outputs a driving power to the brushless DC motor. The control unit is electrically connected with the switch power conversion unit and the brushless DC motor.

15 Claims, 8 Drawing Sheets

DRIVING DEVICE OF BRUSHLESS DC MOTOR FOR FAN

CROSS REFERENCE TO RELATED APPLICATIONS

This Non-provisional application claims priority under 35 U.S.C. §119(a) on Patent Application No(s). 099137578 filed in Taiwan, Republic of China on Nov. 2, 2010, the entire contents of which are hereby incorporated by reference.

BACKGROUND OF THE INVENTION

1. Field of Invention

The present invention relates to a driving device and, in particular, to a driving device of a brushless DC motor for a fan, wherein the driving device has a switch power conversion unit.

2. Related Art

Figure 1:
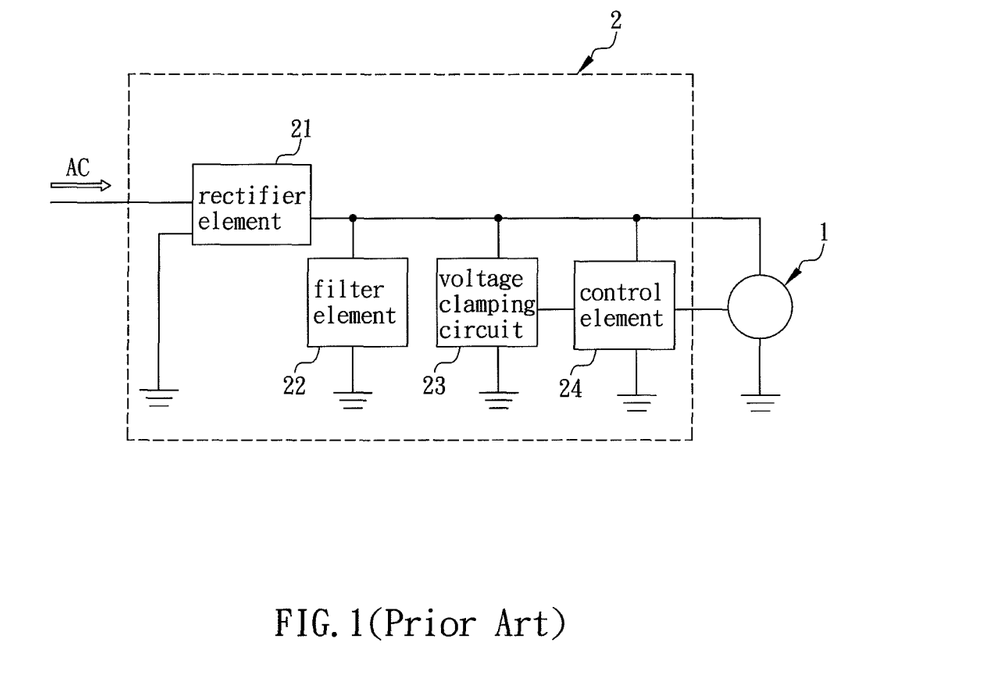
FIG. 1 is a schematic illustration showing a conventional brushless DC motor and a driving device thereof.

FIG. 1 is a schematic illustration showing a conventional brushless DC motor and a driving device thereof. Referring to FIG. 1, a driving device 2 has a rectifier element 21, a filter element 22, a voltage clamping circuit 23 and a control element 24.

The rectifier element 21 receives an alternating current (AC) power AC and rectifies the AC power AC into a pulsating DC power. The filter element 22 filters the pulsating DC power to obtain a more stable direct current (DC) power DC to drive a brushless DC motor 1. In addition, the DC power is inputted to the voltage clamping circuit 23, which outputs a low-voltage auxiliary power to the control element 24. The driving device 2 adjusts the rotating speed of the brushless DC motor 1 by adjusting a pulse width modulation (PWM) signal outputted from the control element 24.

The conventional driving device 2 has the advantage of the simpler circuit design. However, since the driving device 2 rectifies and filters the AC power using the rectifier element 21 and the filter element 22 and directly outputs the DC power to the brushless DC motor 1, the stability of the power provided to the brushless DC motor is affected when the AC power becomes unstable. In addition, the driving device 2 only can convert the AC power into the DC power, but cannot change the voltage level according to the requirement. In other words, the driving device 2 cannot be applied to the AC power with the wider voltage range, and the brushless DC motor 1 only can be applied to the high-voltage operation mode but cannot be applied to the low-voltage operation mode.

Furthermore, the driving device 2 utilizes the voltage clamping circuit 23 to decrease the high-voltage DC power to the low-voltage auxiliary power. However, the voltage clamping circuit 23 causes the very high power loss.

Therefore, it is an important subject of the present invention to provide a driving device of a brushless DC motor for a fan, wherein the power of driving the brushless DC motor can be stably provided, the range of the operation voltage of the driving device can be broadened, and the power loss can be avoided.

SUMMARY OF THE INVENTION

In view of the foregoing, an objective of the present invention is to provide a driving device of a brushless DC motor for a fan, wherein the power of driving the brushless DC motor can be stably provided, the range of the operation voltage of the driving device can be broadened, and the power loss can be avoided.

To achieve the above objective, the present invention discloses a driving device to be electrically connected with an AC power and a brushless DC motor. The driving device includes a rectifier unit, a filter unit, a switch power conversion unit, and a control unit. The rectifier unit receives and rectifies the AC power. The filter unit is electrically connected with the rectifier unit for filtering the rectified AC power to generate a DC power. The switch power conversion unit is electrically connected with the filter unit and the brushless DC motor for receiving the DC power and outputting a driving power to the brushless DC motor. The control unit is electrically connected with the switch power conversion unit and the brushless DC motor.

In one embodiment of the present invention, the switch power conversion unit is a single-stage power conversion unit or a dual-stage power conversion unit.

In one embodiment of the present invention, the switch power conversion unit includes a boost converter, a buck converter, a flyback converter, and/or a forward converter.

As mentioned above, the driving device of the brushless DC motor for the fan according to the present invention utilizes the switch power conversion unit to convert the DC power into a predetermined driving power for driving the brushless DC motor, so that the power for driving the brushless DC motor can be stably provided, the range of the operation voltage of the driving device can be broadened, and the power loss can be avoided.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2A:
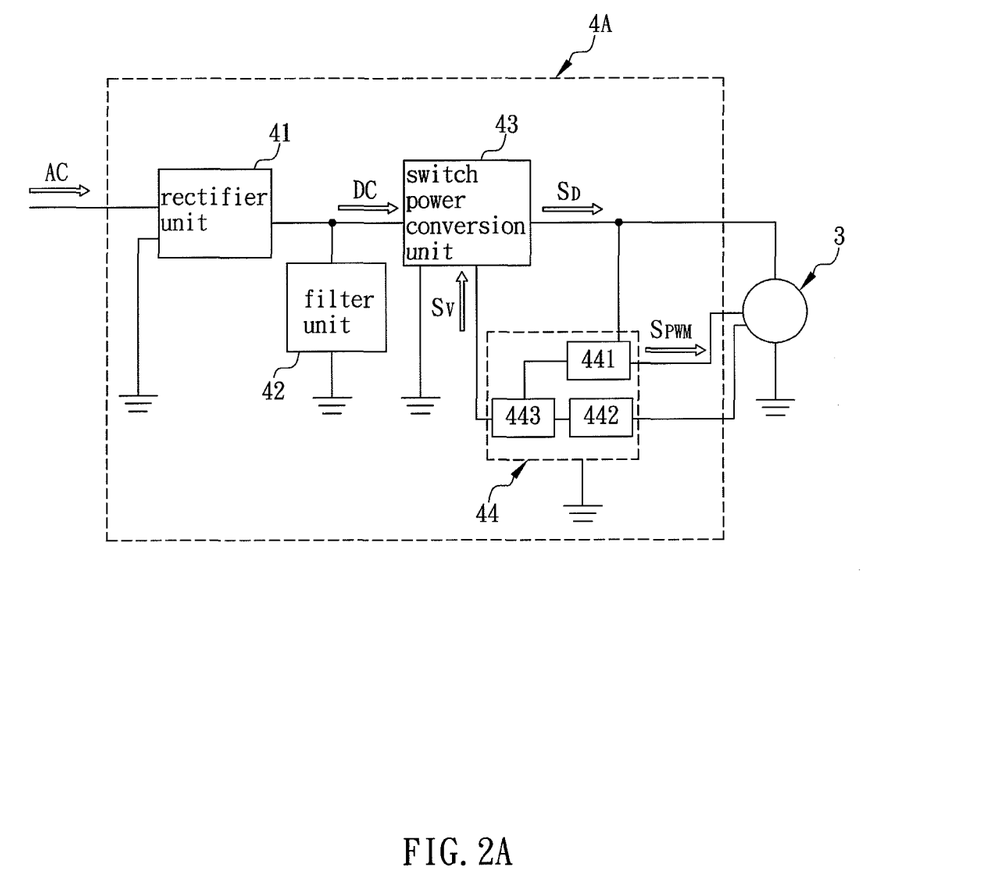
FIGS. 2A and 2B are schematic illustrations showing a brushless DC motor and a driving device thereof according to a preferred embodiment of the present invention.

FIG. 2A shows a driving device 4A of a brushless DC motor according to a preferred embodiment of the present invention. With reference to FIG. 2A, the driving device 4A is electrically connected with an AC power AC and a brushless DC motor 3, which may be further connected with one set of vanes (not shown). The driving device 4A includes a rectifier unit 41, a filter unit 42, a switch power conversion unit 43 and a control unit 44.

The rectifier unit 41 receives and rectifies the AC power AC. In the practical operation, the rectifier unit 41 may be a bridge rectifier.

The filter unit 42 is electrically connected with the rectifier unit 41. The filter unit 42 filters the rectified AC power, outputted from the rectifier unit 41, and generates a DC power DC. In this embodiment, the filter unit 42 is a capacitor.

The switch power conversion unit 43 is electrically connected with the filter unit 42 and the brushless DC motor 3. The switch power conversion unit 43 receives the DC power DC and outputs a driving power $S_D$ to the brushless DC motor 3.

In this embodiment, the switch power conversion unit 43 may be a single-stage power conversion unit or a dual-stage power conversion unit according to the designer's layout or the actual requirement of the product. When the switch power conversion unit 43 is the single-stage power conversion unit, it may be a boost converter, a buck converter, a flyback converter or a forward converter. In addition, when the switch power conversion unit 43 is the dual-stage power conversion unit, it may be a combination of the boost converter and the buck converter, the flyback converter or the forward converter.

The control unit 44 is electrically connected with the switch power conversion unit 43 and the brushless DC motor 3. In this embodiment, the control unit 44 includes a motor driving element 441, a rotating speed detecting element 442 and a micro-controller 443. The motor driving element 441, electrically connected with the switch power conversion unit 43 and the brushless DC motor 3, generates a PWM signal $S_{PWM}$. The rotating speed detecting element 442, electrically connected with the brushless DC motor 3, detects the rotating speed of the brushless DC motor 3. The micro-controller 443 is electrically connected with the motor driving element 441, the rotating speed detecting element 442 and the switch power conversion unit 43.

In practical applications, the micro-controller 443 receives the rotating speed of the brushless DC motor 3 detected by the rotating speed detecting element 442, and provides a voltage signal $S_V$ to the switch power conversion unit 43 according to the rotating speed to adjust the driving power $S_D$ outputted from the switch power conversion unit 43. In addition, the micro-controller 443 may also adjust the PWM signal $S_{PWM}$ of the motor driving element 441 or concurrently adjust the driving power $S_D$ and the PWM signal $S_{PWM}$ according to the rotating speed of the brushless DC motor 3.

According to the above-mentioned hardware architecture, the present invention utilizes the switch power conversion unit to convert the DC power, outputted from the filter unit, into the driving signal with the predetermined voltage level. Consequently, the driving device of the present invention may not be affected by the AC power and can provide a stable driving power to the brushless DC motor. In addition, the driving device can be applied to the wider range of operation voltages according to the configuration of the switch power conversion unit.

Figure 2B:
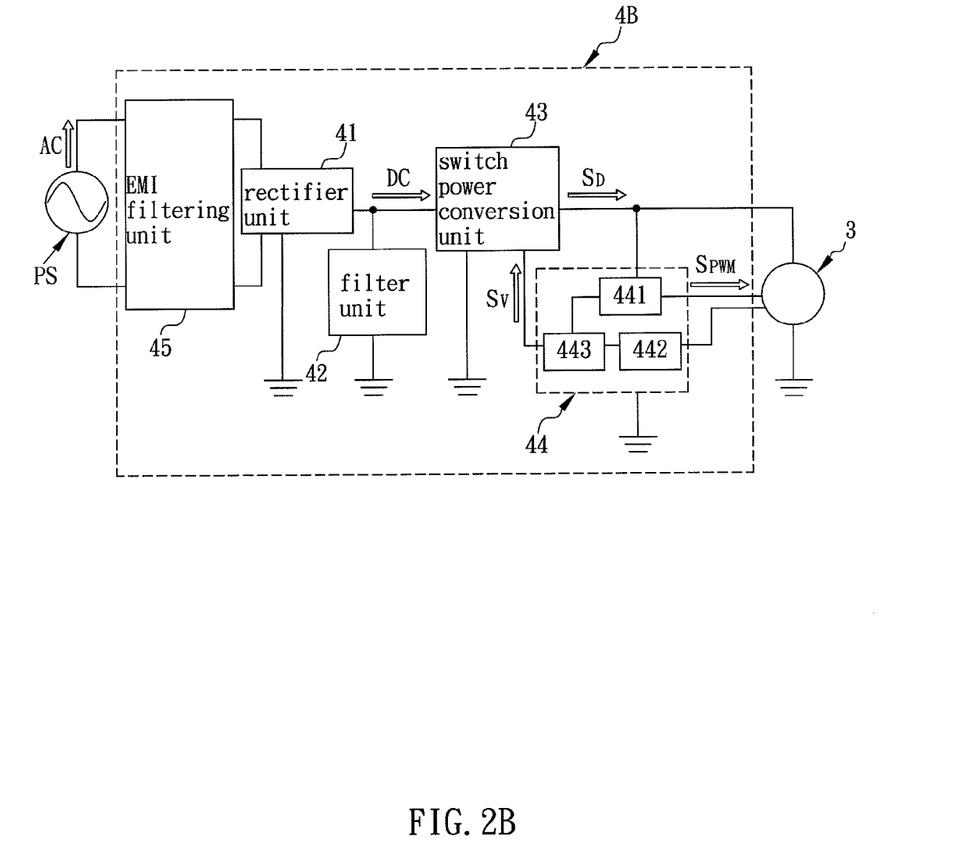

FIG. 2B shows another driving device 4B of the brushless DC motor according to the preferred embodiment of the present invention. Referring to FIG. 2B, the difference between the driving device 4B and the driving device 4A resides in that the driving device 4B further includes an electromagnetic interference (EMI) filtering unit 45.

The electromagnetic interference filtering unit 45, which is electrically connected with an AC power generating unit PS and the rectifier unit 41, filters the AC power AC generated by the AC power generating unit PS, and outputs the filtered AC power to the rectifier unit 41. The electromagnetic interference filtering unit 45 is used to eliminate the common mode noise and the differential mode noise. In addition, the electromagnetic interference filtering unit 45 may be a common mode choke coil, a passive filter or an active filter in the practical application.

As mentioned hereinabove, the architecture of the switch power conversion unit 43 in the practical application can have different aspects according to different requirements. Four application architectures used when the switch power conversion unit 43 is the single-stage power conversion unit will be described with reference to FIGS. 3A to 3D.

Figure 3A:
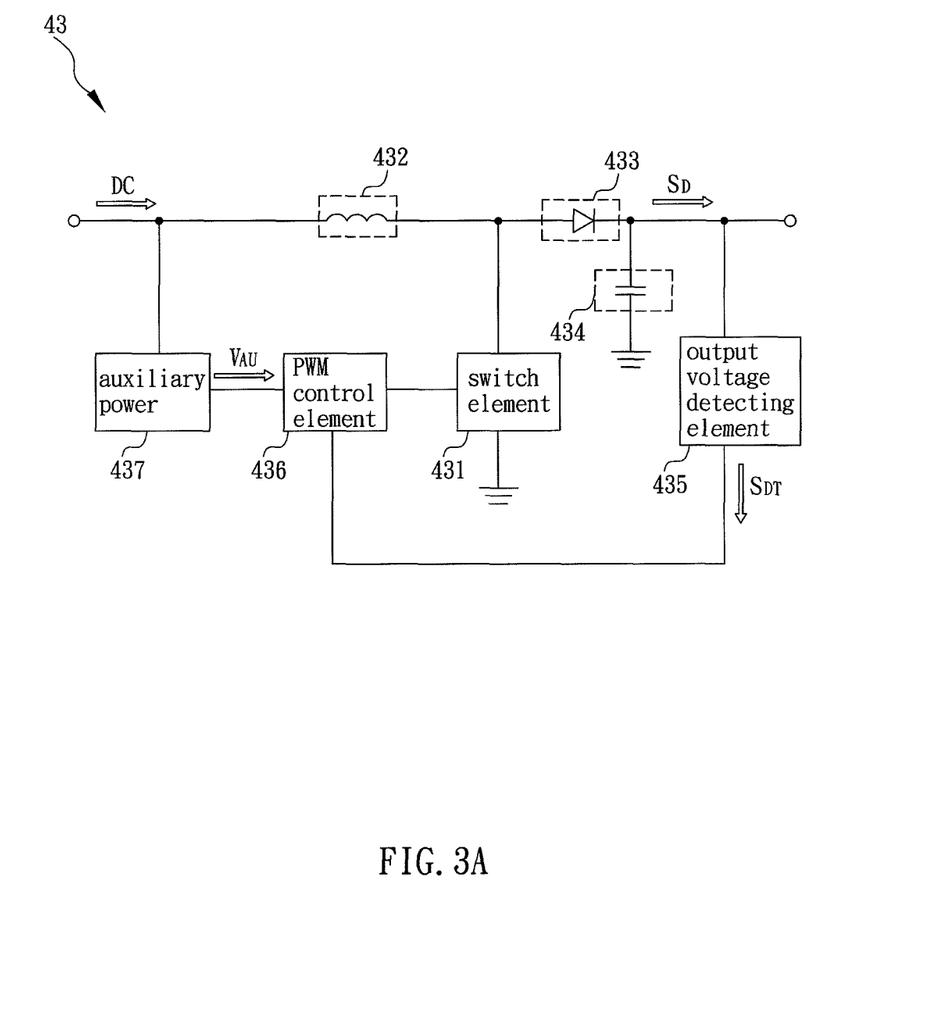
FIGS. 3A to 3D are schematic illustrations showing different modifications of the switch power conversion unit according to the embodiment of the present invention.

Referring to FIG. 3A, the switch power conversion unit 43 is a boost converter. The boost converter includes a switch element 431, an inductor 432, a rectifier element 433, a capacitor 434, an output voltage detecting element 435, a PWM control element 436 and an auxiliary power 437. In practice, the switch element 431 may be a metal-oxide-semiconductor field-effect transistor (MOSFET), and the switch element 431 performs the successive, periodical ON/OFF switches with the switching frequency equal to a predefined value.

The inductor 432 has one terminal for receiving the DC power DC outputted from the filter element, and the other terminal electrically connected with the switch element 431. The rectifier element 433 has a first terminal and a second terminal. The first terminal of the rectifier element 433 is electrically connected with the other terminal of the inductor 432 and the switch element 431. The second terminal of the rectifier element 433 is electrically connected with the brushless DC motor. In this embodiment, the rectifier element 433 is a diode.

The capacitor 434 has one terminal electrically connected with the second terminal of the rectifier element 433 and the brushless DC motor, and the other terminal grounded. The output voltage detecting element 435, electrically connected with the second terminal of the rectifier element 433, the other terminal of the capacitor 434 and the brushless DC motor, outputs a detection signal $S_{DT}$ according to the driving power $S_D$.

The PWM control element 436, electrically connected with the switch element 431 and the output voltage detecting element 435, adjusts a duty cycle of the switch element 431 according to the detection signal $S_{DT}$ so that the switch element 431 performs the ON/OFF switching operations. The auxiliary power 437, electrically connected with the PWM control element 436, provides an auxiliary voltage $V_{AU}$ to the PWM control element 436.

In addition, it is to be noted that the boost converter can make the voltage level of the outputted driving signal be higher than the voltage level of the received DC power, and the boost converter simultaneously has the power factor correcting function.

Figure 3B:
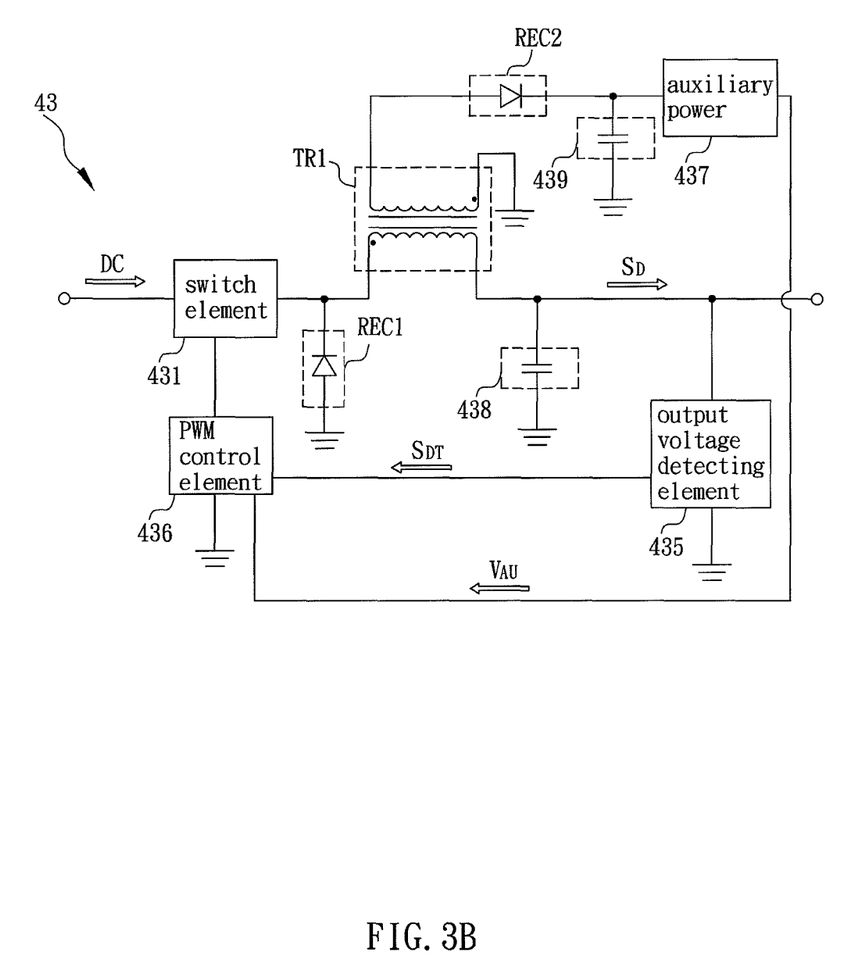

Referring next to FIG. 3B, the switch power conversion unit 43 is a buck converter including a switch element 431, an electric isolation unit TR1, a first rectifier element REC1, a first capacitor 438, a second rectifier element REC2, a second capacitor 439, an output voltage detecting element 435, a PWM control element 436 and an auxiliary power 437. In this embodiment, the switch element 431 receives the DC power DC outputted from the filter element.

The electric isolation unit TR1 has a non-electric-isolating side and an electric-isolating side coupled therewith. The non-electric-isolating side has an input terminal electrically connected with the switch element 431.

The first rectifier element REC1 has one terminal electrically connected with the switch element 431 and the input terminal of the non-electric-isolating side of the electric isolation unit TR1, and the other terminal grounded. The first capacitor 438 has one terminal electrically connected with the output terminal of the non-electric-isolating side of the electric isolation unit TR1 and the brushless DC motor, and the other terminal grounded. In this embodiment, the first rectifier element REC1 is a diode.

The second rectifier element REC2 has one terminal electrically connected with the electric-isolating side of the electric isolation unit TR1. The second capacitor 439 has one terminal electrically connected with the second rectifier element REC2, and the other terminal grounded. In this embodiment, the second rectifier element REC2 is a diode.

The output voltage detecting element 435 is electrically connected with the output terminal of the non-electric-isolating side of the electric isolation unit TR1, the one terminal of the first capacitor 438 and the brushless DC motor. The output voltage detecting element 435 outputs a detection signal $S_{DT}$ according to the driving power $S_D$.

The PWM control element 436, electrically connected with the switch element 431 and the output voltage detecting element 435, adjusts the duty cycle of the switch element 431 according to the detection signal $S_{DT}$, and thus adjusts the rotating speed of the brushless DC motor.

The auxiliary power 437, electrically connected with the other terminal of the second rectifier element REC2, the one terminal of the second capacitor 439 and the PWM control element 436, provides an auxiliary voltage $V_{AU}$ to the PWM control element 436.

Figure 3C:
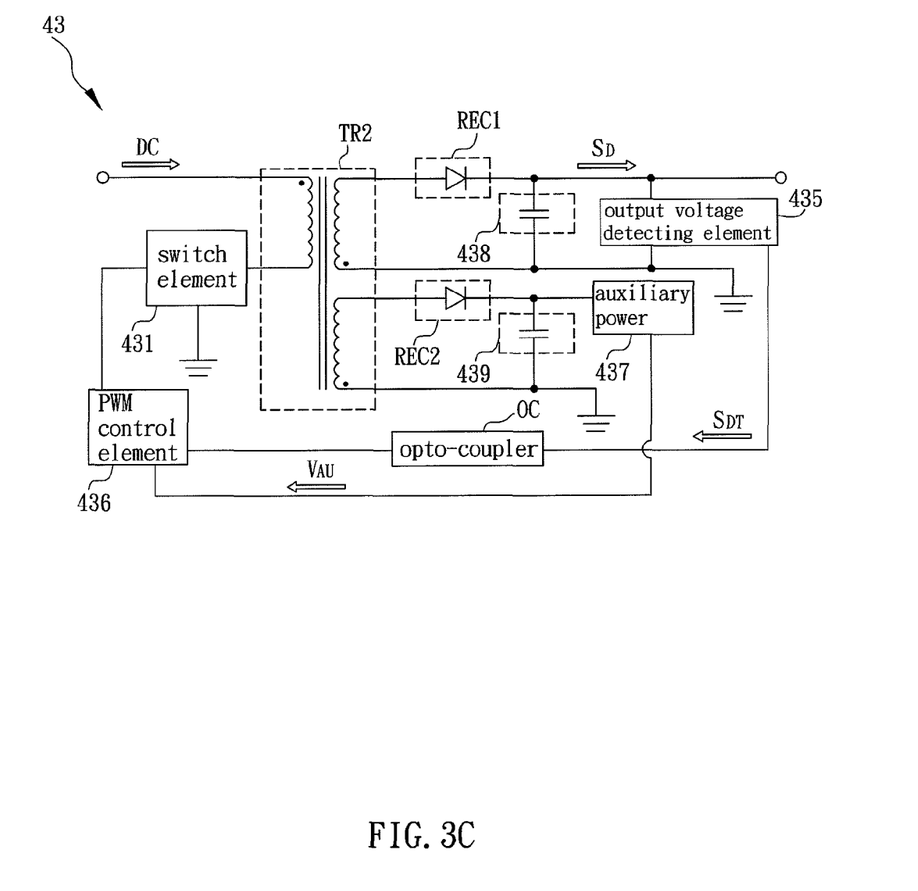

Next, as shown in FIG. 3C, the switch power conversion unit 43 is a flyback converter, which includes a switch element 431, an electric isolation unit TR2, a first rectifier element REC1, a first capacitor 438, a second rectifier element REC2, a second capacitor 439, an output voltage detecting element 435, a PWM control element 436 and an auxiliary power 437.

In this embodiment, the electric isolation unit TR2 has a non-electric-isolating side, and a first electric-isolating side and a second electric-isolating side both connected with the non-electric-isolating side. The non-electric-isolating side has an input terminal for receiving the DC power DC, and an output terminal electrically connected with the switch element 431.

The first rectifier element REC1 has one terminal electrically connected with the first electric-isolating side of the electric isolation unit TR2. The first capacitor 438 has one terminal electrically connected with the first rectifier element REC1 and the brushless DC motor, and the other terminal grounded. The second rectifier element REC2 has one terminal electrically connected with the second electric-isolating side of the electric isolation unit TR2. The second capacitor 439 has one terminal electrically connected with the second rectifier element REC2, and the other terminal grounded. In this embodiment, each of the first rectifier element REC1 and the second rectifier element REC2 is a diode.

The output voltage detecting element 435, electrically connected with the other terminal of the first rectifier element REC1, the one terminal of the first capacitor 438 and the brushless DC motor, outputs a detection signal $S_{DT}$ according to the driving power $S_D$. The PWM control element 436 is electrically connected with the switch element 431 and coupled with the output voltage detecting element 435. The PWM control element 436 adjusts the duty cycle of the switch element 431 according to the detection signal $S_{DT}$. In practice, the output voltage detecting element 435 may be coupled with the PWM control element 436 through an opto-coupler OC, wherein the output voltage detecting element 435 is electrically connected with an input terminal of the opto-coupler OC, and the PWM control element 436 is electrically connected with an output terminal of the opto-coupler OC.

The auxiliary power 437, electrically connected with the other terminal of the second rectifier element REC2, the one terminal of the second capacitor 439 and the PWM control element 436, provides an auxiliary voltage $V_{AU}$ to the PWM control element 436.

Figure 3D:
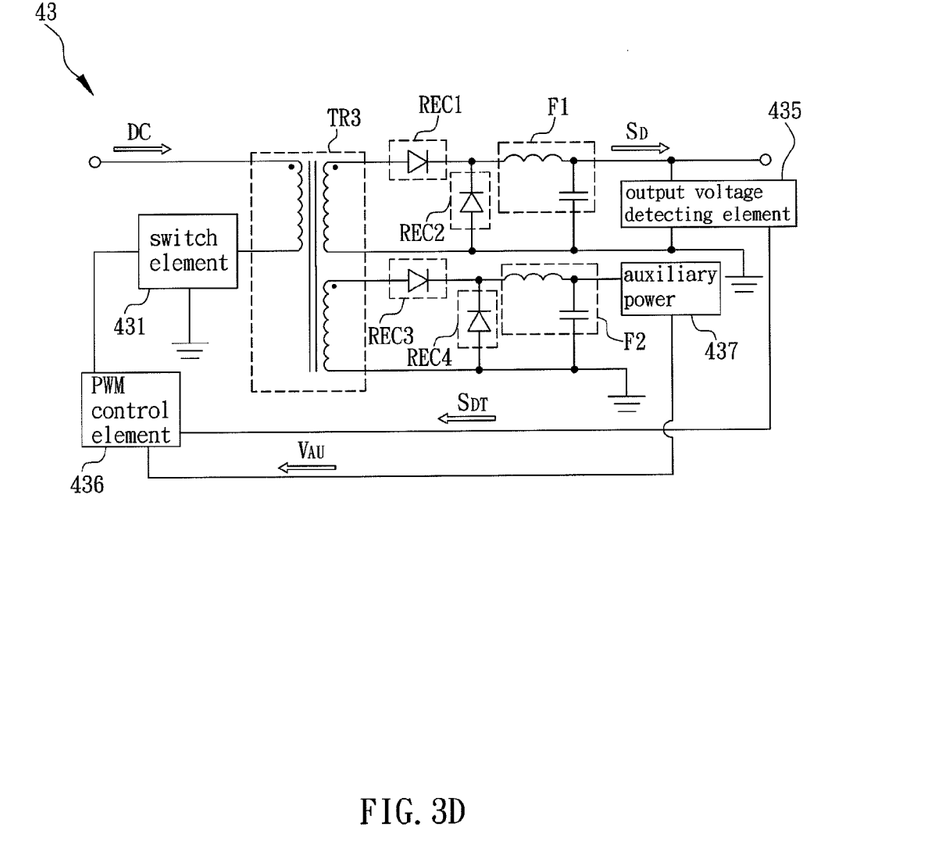

Referring next to FIG. 3D, the switch power conversion unit 43 is a forward converter, which includes a switch element 431, an electric isolation unit TR3, a first rectifier element REC1, a second rectifier element REC2, a first filter element F1, a third rectifier element REC3, a fourth rectifier element REC4, a second filter element F2, an output voltage detecting element 435, a PWM control element 436 and an auxiliary power 437.

In this embodiment, the electric isolation unit TR3 has a non-electric-isolating side, and a first electric-isolating side and a second electric-isolating side coupled therewith. The non-electric-isolating side has an input terminal for receiving the DC power DC, and an output terminal electrically connected with the switch element 431.

The first rectifier element REC1 has one terminal electrically connected with the first electric-isolating side of the electric isolation unit TR3. The second rectifier element REC2 has one terminal electrically connected with the other terminal of the first rectifier element REC1, and the other terminal grounded.

The first filter element F1 is electrically connected with the other terminal of the first rectifier element REC1, the one terminal of the second rectifier element REC2 and the brushless DC motor. The third rectifier element REC3 has one terminal electrically connected with the second electric-isolating side of the electric isolation unit TR3. The fourth rectifier element REC4 has one terminal electrically connected with the other terminal of the second rectifier element REC2, and the other terminal grounded. The second filter element F2 is electrically connected with the other terminal of the third rectifier element REC3 and the one terminal of the fourth rectifier element REC4.

In this embodiment, each of the first rectifier element REC1, the second rectifier element REC2, the third rectifier element REC3 and the fourth rectifier element REC4 is a diode. In addition, each of the first filter element F1 and the second filter element F2 includes an inductor and a capacitor.

The output voltage detecting element 435, electrically connected with the first filter element F1 and the brushless DC motor, outputs a detection signal $S_{DT}$ according to the driving power $S_D$. The PWM control element 436, electrically connected with the switch element 431 and coupled with the output voltage detecting element 435, adjusts the duty cycle of the switch element 431 according to the detection signal $S_{DT}$. The auxiliary power 437, electrically connected with the second filter element F2 and the PWM control element 436, provides an auxiliary voltage $V_{AU}$ to the PWM control element 436.

In addition, when the switch power conversion unit 43 is a dual-stage power conversion unit, it is a combination of a boost converter and a buck converter, a flyback converter or a forward converter. In other words, the first-stage switch power conversion unit of the switch power conversion unit 43 needs to be the boost converter, while the second-stage switch power conversion unit is not restricted to the buck converter, the flyback converter or the forward converter.

Figure 4:
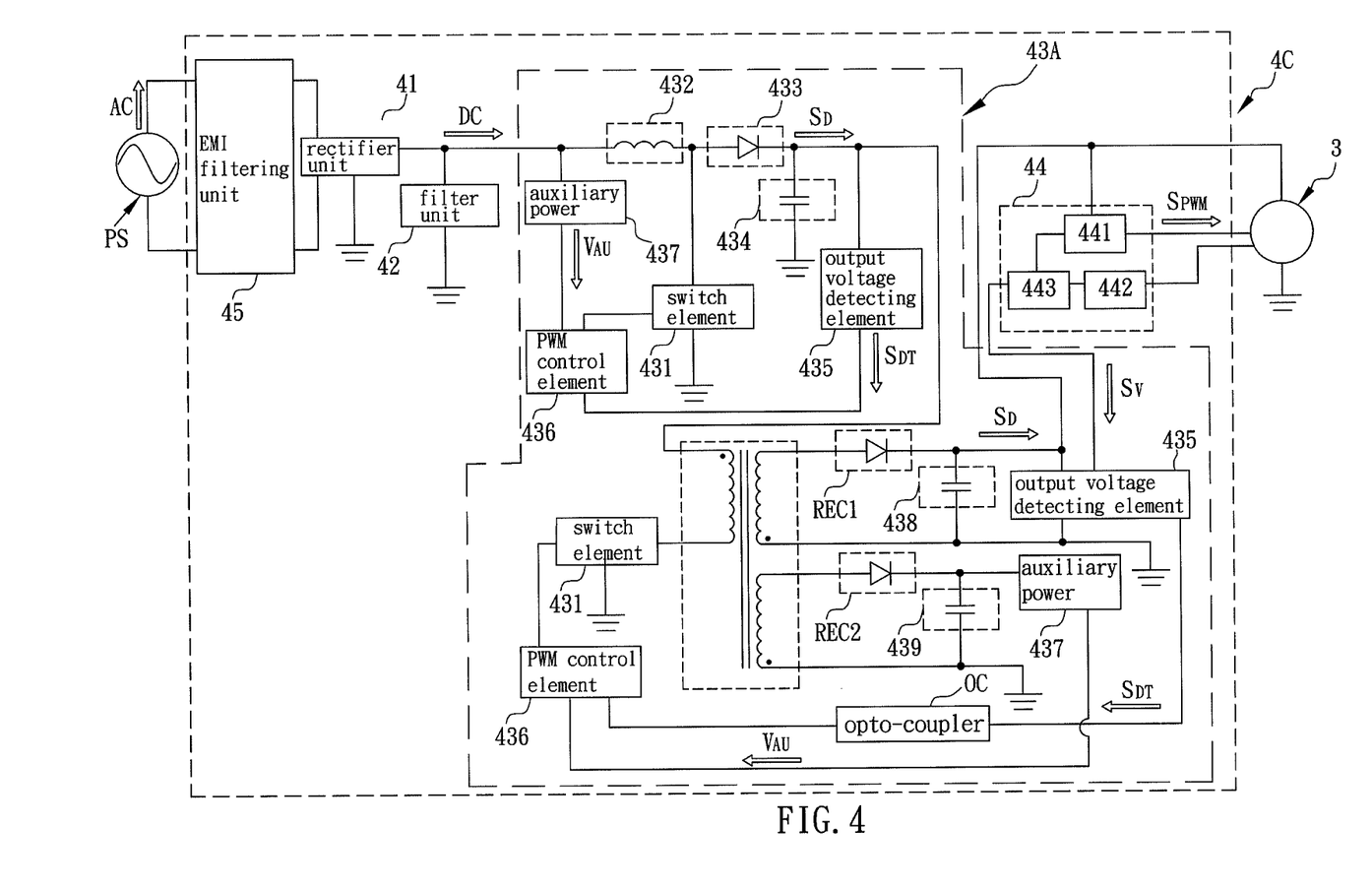
FIG. 4 is a schematic illustration showing another brushless DC motor and another driving device thereof according to the preferred embodiment of the present invention.

FIG. 4 shows a driving device 4C of the brushless DC motor according to the preferred embodiment of the present invention. In this embodiment, the driving device 4C includes a dual-stage power conversion unit 43A, which includes a boost converter and a flyback converter.

According to the above-mentioned hardware architecture, the first-stage switch power conversion unit may function to calibrate the power factor, and the second-stage switch power conversion unit may function to adjust the rotating speed of the brushless DC motor. Consequently, the driving device of the present invention provides a stable driving power to the brushless DC motor and avoids the power loss.

To sum up, the driving device of the brushless DC motor for the fan according to the present invention utilizes the switch power conversion unit to convert the DC power into a predetermined driving power for driving the brushless DC motor, so that the power for driving the brushless DC motor can be stably provided, the range of the operation voltage of the driving device can be broadened, and the power loss can be avoided.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A driving device to be electrically connected with an AC power and a brushless DC motor, the driving device comprising:
    a rectifier unit for receiving and rectifying the AC power;
    a filter unit, which is electrically connected with the rectifier unit and for filtering the rectified AC power to generate a DC power;
    a switch power conversion unit, which is electrically connected with the filter unit and the brushless DC motor and receives the DC power and outputs a driving power to the brushless DC motor, wherein the switch power conversion unit comprises a boost converter; and
    a control unit electrically connected with the switch power conversion unit and the brushless DC motor,
    wherein the boost converter comprises:
    a switch element;
    an inductor having one terminal for receiving the DC power and the other terminal electrically connected with the switch element;
    a rectifier element having a first terminal electrically connected with the other terminal of the inductor and the switch element, and the second terminal electrically connected with the brushless DC motor;
    a capacitor having one terminal electrically connected with the second terminal of the rectifier element and the brushless DC motor, and the other terminal grounded;
    an output voltage detecting element, which is electrically connected with the second terminal of the rectifier element, the other terminal of the capacitor and the brushless DC motor, and outputs a detection signal according to the driving power;
    a PWM control element, which is electrically connected with the switch element and the output voltage detecting element, and adjusts a duty cycle of the switch element according to the detection signal; and a auxiliary power, which is electrically connected with the PWM control element and provides an auxiliary voltage to the PWM control element.

2. The driving device according to claim 1, wherein the rectifier unit is a bridge rectifier.

3. The driving device according to claim 1, wherein the filter unit comprises a capacitor.

4. The driving device according to claim 1, wherein the switch power conversion unit is a single-stage power conversion unit or a dual-stage power conversion unit.

5. The driving device according to claim 1, wherein the switch element is a metal-oxide-semiconductor field-effect transistor (MOSFET).

6. The driving device according to claim 1, wherein a switching frequency of the switch element is a predefined value.

7. The driving device according to claim 1, further comprising an electromagnetic interference filtering unit, which is electrically connected with an AC power generating unit and the rectifier unit, filters the AC power generated by the AC power generating unit, and outputs the filtered AC power to the rectifier unit.

8. The driving device according to claim 1, wherein the control unit comprises:
    a motor driving element, which is electrically connected with the switch power conversion unit and the brushless DC motor and generates a PWM signal;
    a rotating speed detecting element, which is electrically connected with the brushless DC motor and detects a rotating speed of the brushless DC motor; and
    a micro-controller electrically connected with the motor driving element, the rotating speed detecting element and the switch power conversion unit.

9. The driving device according to claim 8, wherein the micro-controller adjusts the driving power, outputted from the switch power conversion unit, and/or the PWM signal of the motor driving element according to the rotating speed of the brushless DC motor.

10. The driving device according to claim 8, wherein the micro-controller provides a voltage signal to the switch power conversion unit to adjust the driving power outputted from the switch power conversion unit.

11. A driving device to be electrically connected with an AC power and a brushless DC motor, the driving device comprising:
    a rectifier unit for receiving and rectifying AC power;
    a filter unit, which is electrically connected with the rectifier unit and for filtering the rectified AC power to generate a DC power;
    a switch power conversion unit, which is electrically connected with the filter unit and the brushless DC motor and receives the DC power and outputs a driving power to the brushless DC motor, wherein the switch power conversion unit comprises a buck converter; and
    a control unit electrically connected with the switch power conversion unit and the brushless DC motor,
    wherein the buck converter comprises:
    a switch element for receiving the DC power;
    an electric isolation unit having a non-electric-isolating side and an electric-isolating side coupled with the non-electric-isolating side, wherein the non-electric-isolating side has an input terminal electrically connected with the switch element;
    a first rectifier element having one terminal electrically connected with the switch element and an input terminal of the non-electric-isolating side of the electric isolation unit, and the other terminal grounded;
    a first capacitor having one terminal electrically connected with an output terminal of the non-electric-isolating side of the electric isolation unit and the brushless DC motor, and the other terminal grounded;
    a second rectifier element having one terminal electrically connected with the electric-isolating side of the electric isolation unit;
    a second capacitor having one terminal electrically connected with the second rectifier element, and the other terminal grounded;

an output voltage detecting element, which is electrically connected with the output terminal of the non-electric-isolating side of the electric isolation unit, the one terminal of the first capacitor and the brushless DC motor, and outputs a detection signal according to the driving power;

a PWM control element, which is electrically connected with the switch element and the output voltage detecting element, and adjusts a duty cycle of the switch element according to the detection signal; and an auxiliary power, which is electrically connected with the other terminal of the second rectifier element, the one terminal of the second capacitor and the PWM control element, and provides an auxiliary voltage to the PWM control element.

12. A driving device to be electrically connected with an AC power and a brushless DC motor, the driving device comprising:

a rectifier unit for receiving and rectifying the AC power;

a filter unit, which is electrically connected with the rectifier unit and for filtering the rectified AC power to generate a DC power;

a switch power conversion unit, which is electrically connected with the filter unit and the brushless DC motor and receives the DC power and outputs a driving power to the brushless DC motor, wherein the switch power conversion nit comprises a flyback converter; and a control unit electrically connected with the switch power conversion unit and the brushless DC motor, wherein the flyback converter comprises:

a switch element;

an electric isolation unit having a non-electric-isolating side and a first electric-isolating side and a second electric-isolating side both coupled with the non-electric-isolating side, wherein the non-electric-isolating side has an input terminal for receiving the DC power, and an output terminal electrically connected with the switch element;

a first rectifier element having one terminal electrically connected with the first electric-isolating side of the electric isolation unit;

a first capacitor having one terminal electrically connected with the first rectifier element and the brushless DC motor, and the other terminal grounded;

a second rectifier element having one terminal electrically connected with the second electric-isolating side of the electric isolation unit;

a second capacitor having one terminal electrically connected with the second rectifier element, and the other terminal grounded;

an output voltage detecting element, which is electrically connected with the other terminal of the first rectifier element, the one terminal of the first capacitor and the brushless DC motor, and outputs a detection signal according to the driving power;

a PWM control element, which is electrically connected with the switch element and coupled with the output voltage detecting element, and adjusts a duty cycle of the switch element according to the detection signal; and an auxiliary power, which is electrically connected with the other terminal of the second rectifier element, the one terminal of the second capacitor and the PWM control element, and provides an auxiliary voltage to the PWM control element.

13. The driving device according to claim 12, wherein the output voltage detecting element is electrically connected with an input terminal of an opto-coupler, and the PWM control element is electrically connected with an output terminal of the opto-coupler.

14. A driving device to be electrically connected with an AC power and a brushless DC motor, the driving device comprising:

a rectifier unit for receiving and rectifying the AC power;

a filter unit, which is electrically connected with the rectifier unit and for filtering the rectified AC power to generate a DC power;

a switch power conversion unit, which is electrically connected with the filter unit and the brushless DC motor and receives the DC power and outputs a driving power to the brushless DC motor, wherein the switch power conversion unit comprises a forward converter; and a control unit electrically connected with the switch power conversion unit and the brushless DC motor, wherein the forward converter comprises:

a switch element;

an electric isolation unit having a non-electric-isolating side and a first electric-isolating side and a second electric-isolating side both coupled with the non-electric-isolating side, wherein the non-electric-isolating side has an input terminal for receiving the DC power, and an output terminal electrically connected with the switch element;

a first rectifier element having one terminal electrically connected with the first electric-isolating side of the electric isolation unit;

a second rectifier element having one terminal electrically connected with the other terminal of the first rectifier element, and the other terminal grounded;

a first filter element electrically connected with the other terminal of the first rectifier element, the one terminal of the second rectifier element and the brushless DC motor;

a third rectifier element having one terminal electrically connected with the second electric-isolating side of the electric isolation unit;

a fourth rectifier element having one terminal electrically connected with the other terminal of the second rectifier element, and the other terminal grounded;

a second filter element electrically connected with the other terminal of the third rectifier element and the one terminal of the fourth rectifier element;

an output voltage detecting element, which is electrically connected with the first filter element and the brushless DC motor and outputs a detection signal according to the driving power;

a PWM control element, which is electrically connected with the switch element and coupled with the output voltage detecting element, and adjusts a duty cycle of the switch element according to the detection signal; and an auxiliary power, which is electrically connected with the second filter element and the PWM control element, and provides an auxiliary voltage to the PWM control element.

15. The driving device according to claim 14, wherein each of the first filter element and the second filter element comprises an inductor and a capacitor.

* * * * *